Figure 1:
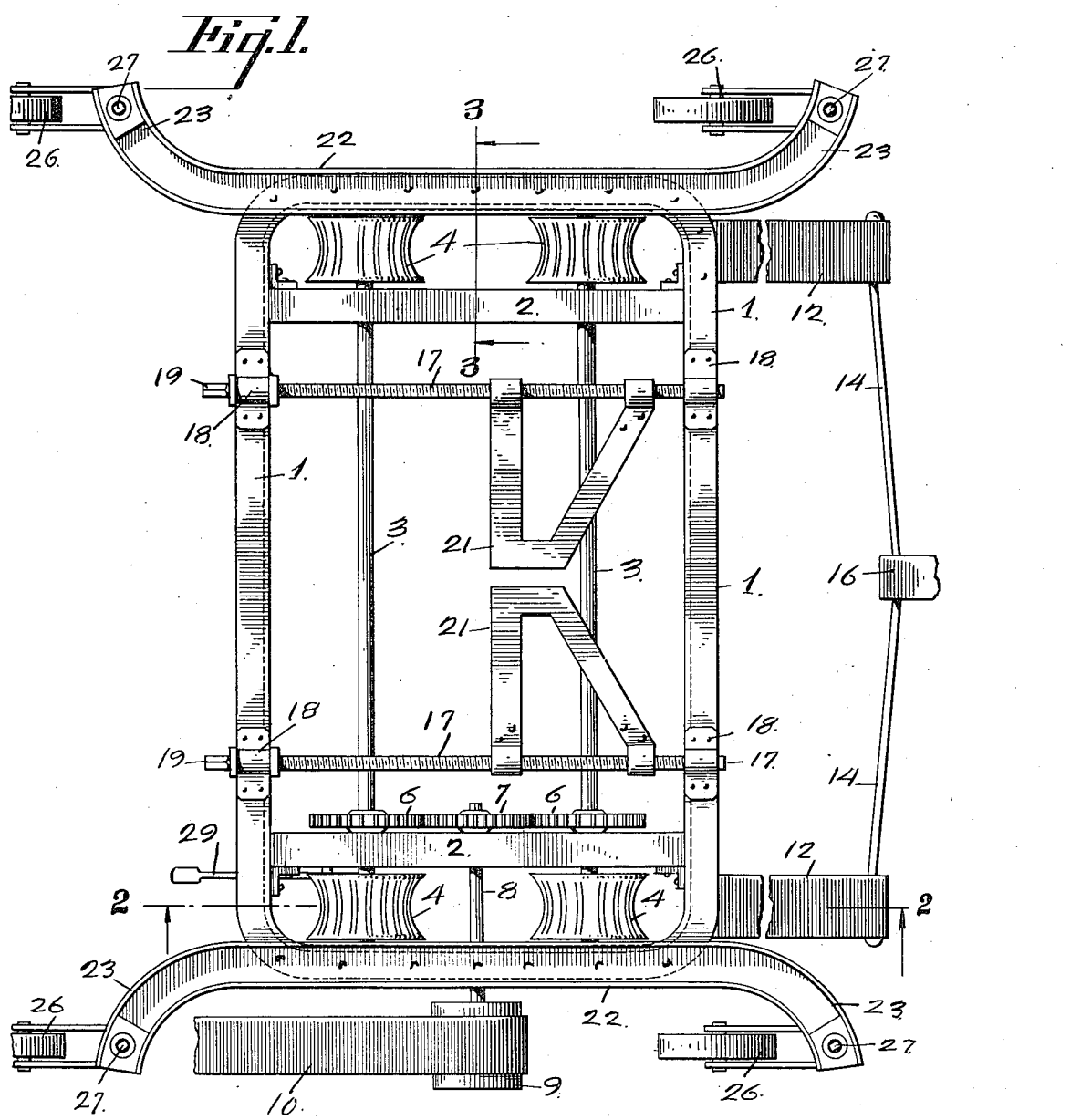

W. J. LINDECKER.
PORTABLE POWER TRANSMITTING DEVICE.
APPLICATION FILED JUNE 11, 1921.

1,415,460.

Patented May 9, 1922.

2 SHEETS—SHEET 2.

INVENTOR.
William J. Lindecker
By Arthur L. Slee
ATTY.

UNITED STATES PATENT OFFICE.

WILLIAM J. LINDECKER, OF SAN FRANCISCO, CALIFORNIA.

PORTABLE POWER-TRANSMITTING DEVICE.

1,415,460.

Specification of Letters Patent. Patented May 9, 1922.

Application filed June 11, 1921. Serial No. 476,906.

*To all whom it may concern:*

Be it known that I, WILLIAM J. LINDECKER, a citizen of the United States, residing in the city and county of San Francisco and State of California, have invented a new and useful Improvement in a Portable Power-Transmitting Device, of which the following is a specification.

My invention relates to improvements in portable power transmitting devices wherein two pairs of rollers are arranged to support the rear wheels of a motor vehicle and to receive and transmit power therefrom to a driving pulley.

The primary object of my invention is to provide a new and improved portable power transmitting device for transmitting power from a motor vehicle to various agricultural and other devices.

Another object is to provide an improved device of the character described which shall be simple and cheap in construction and operation and having a maximum efficiency.

A further object is to provide an improved device of the character set forth which may rest upon the ground while in use and having simple and easily operated means for rendering the device readily transportable.

A still further object of the invention is to provide an improved portable power transmitting device arranged to be towed behind the vehicle from which it is to transmit the power, in line with the rear wheels of said vehicle or in such a position that said vehicle may be readily and easily backed or rolled onto said device.

A still further object of the invention is to provide a light and compact construction wherein several members are arranged and adapted to perform several functions and thereby lessen the number of required parts and at the same time to lessen the cost of construction and manufacture.

Figure 2:
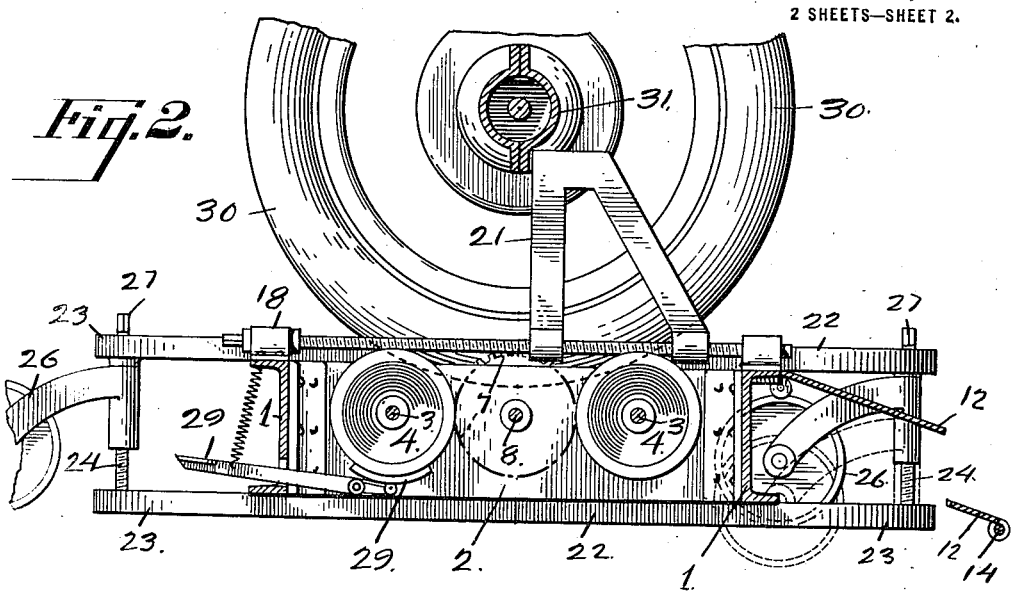
Figure 3:
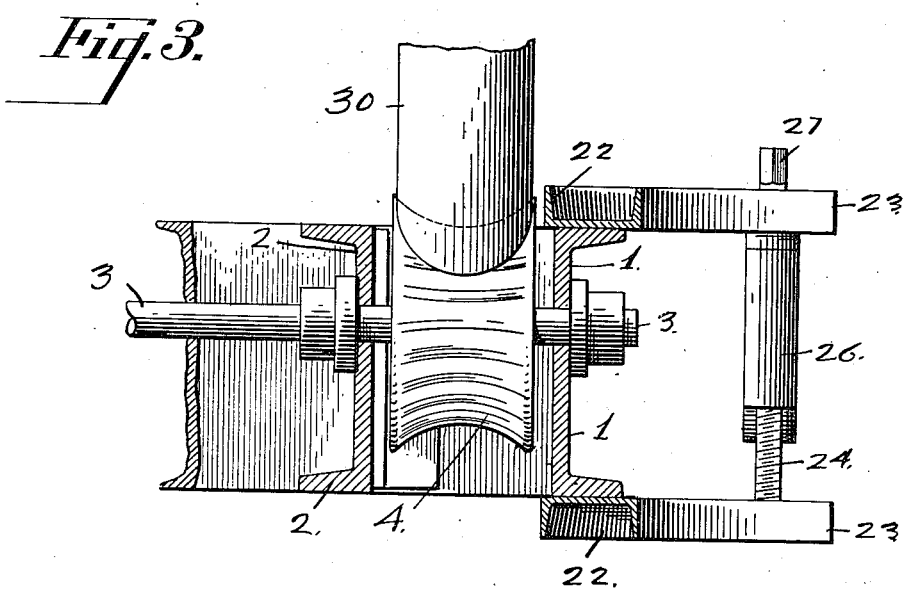

I accomplish these and other objects by means of the improved device disclosed in the drawings forming a part of the present specification wherein like characters of reference are used to designate similar parts throughout the said specification and drawings, and in which:

Fig. 1 is a broken plan view of my improved device;

Fig. 2 is a broken vertical transverse sectional view taken on line 2—2 of Fig. 1 in the direction indicated, with the vehicle retaining means in operative position and also showing a rear axle housing of a motor vehicle in section and a partly broken wheel on the far side of the device; and Fig. 3 is an enlarged broken vertical section taken on line 3—3 of Fig. 1 in the direction indicated, disclosing a broken portion of a wheel mounted upon the rollers.

Referring to the drawings the numeral 1 is used to designate a substantially rectangular frame composed preferably of channel irons with their flanges extending outwardly.

The frame 1 is reinforced by means of two lateral or transverse members 2 also of channel iron and arranged adjacent the ends of the frame 1 as disclosed in Figs. 1 and 3 of the drawings.

Longitudinally disposed parallel shafts 3 are rotatably mounted within the frame 1 and members 2 and are provided with preferably knurled rollers 4, the rollers 4 on each shaft 3 being spaced a distance equal to the distance between the rear wheels of a motor vehicle.

The shafts 3 are also provided with gears 6 meshing with a gear 7 on a counter shaft 8 provided with a driving pulley or sheave 9 which in turn drives a suitable belt 10 connected to the machine or device to be operated, not shown.

Directly opposite each pair of rollers 4 and hingedly connected to the frame 1 is an incline 12, both of said inclines being provided to raise the rear wheels of a motor vehicle onto the frame 1 and rollers 4 therein. The inclines 12 are connected by means of a rod 14 having a suitable drawbar 16, of any type suitable for attachment to a motor vehicle, whereby said frame 1 many be towed back of a motor vehicle with the rollers 4 directly in back of the rear wheels of said vehicle thereby facilitating the placement of said vehicle on the rollers 4.

In order to retain the vehicle on the device I have provided a pair of transverse threaded shafts 17 rotatably mounted within suitable bearings 18 on the frame 1 and provided with squared ends 19 to receive a tool, not shown, for turning the said rods, the purpose of which will hereinafter be more fully set forth.

Screw threaded, and therefore rotatably mounted, upon the rods 17 are braces 21 which, when inoperative, rest horizontally as disclosed in Fig. 1 of the drawings, but when in operative position are arranged perpendicularly to engage the front side of the rear axle housing of the motor vehicle being engaged, as disclosed in Fig. 2 of the drawings. By rotating the shafts or rods 17 the rear ends of the upper portions of the braces 21 may be moved into contact with the housing and the rods 17 thereby forming an adjustable means for engaging said rear axle housing and retaining the vehicle on the frame 1 while the wheels of said vehicle are rotating the rollers 4.

By means of the threaded rod features the braces 21 may be adjusted to various types and makes of motor vehicles.

A pair of channels 22, having offset ends 23, are mounted upon the upper and lower sides respectively of the ends of the frame 1.

These channels form a triple function. First, they are provided to give a larger supporting base to the device without materially increasing the size and weight of the device. Second, the downwardly extending flanges of te lower channels bite into the ground and firmly secure the device against movement while in operation. Third, they form guides on the outer sides of the vehicle wheels to prevent lateral movement of the same while said vehicle wheels are rotating, thereby preventing the said wheels from moving laterally while mounted upon said rollers.

The opposite offset portions 23 of said channels have threaded vertically disposed shafts 24 rotatably mounted between them and on these shafts 24 are screwed, and therefore rotatably mounted, suitable castors 26 upon which the device is transported or towed.

By being offset the ends of the channels 22 rotatably and pivotally support the castors 26 in such a manner that the device may easily follow a motor vehicle by which it is being towed, said castors 26 being free to swing through an arc of more than 180 degrees while the device is in motion or transportation.

The shafts 24 are provided with squared portions 27 to receive a tool, not shown, for rotating them to raise or lower said castors 26 upon the threaded rods 24 and thereby raise or lower the entire device from the ground.

A suitable brake 29 is provided and arranged to engage one of the rollers 4 whereby rotation of said rollers may be prevented to facilitate placement or removal of the motor vehicle from the device.

In operation, the device is towed by a motor vehicle to the location at which the power is to be transmitted to an agricultural or other machine, not shown, by means of the draw-bar 16, which is in position to tow the device with the rollers 4 directly back of the rear wheels 30 of said vehicle.

When the desired location has been reached the draw-bar 16 is disconnected from the motor vehicle leaving the said device and the rollers 4 and the inclines 12 thereon directly in line with the said rear wheels 30 of said motor vehicle.

The vertically disposed threaded shafts 24 are then each rotated in turn by applying a suitable turning tool, not shown, to the squared ends 27 of said shafts 24 to raise the castors 26 and thereby lower the frame 1 onto the ground.

The brake 29 is then applied to prevent rotation of the rollers 4 while the rear wheels 30 of the vehicle are backed up said inclines 12, and onto the upper surfaces of the channels of the frame 1, which upper surfaces are arranged level or flush with the tops of the treads of said rollers.

The belt 10 is then connected to the pulley 9 and to the device to which the power is to be transmitted.

The braces 21 are then raised to a vertical position and adjusted to the front side of the rear axle housing 31 by rotating the threaded rods 17.

The motor of the vehicle is then started to rotate the wheels 30 which rotation is imparted to the rollers 4, shafts 3, and gears 6 and 7 and the counter shaft 8, which in turn rotates the pulley 9 and by means of the belt 10 operates the machine or device to which it is connected.

When preparing the device for transportation to another location the above operation is reversed.

The provision of the draw-bar 16 connected to the inclines 12 also provides a novel feature in that the said inclines need no folding or disconnecting but are used for towing the device directly in line with the rear wheels 30 of the vehicle in order to facilitate placement of said wheels upon the device.

Having thus described my invention what I claim as new and desire to secure by Letters Patent is:

1. A portable power transmitting device comprising a frame; rollers rotatably mounted upon said frame and arranged to engage and support the rear wheels of a motor vehicle; a driving pulley connected to said rollers whereby the same may be rotated by the said rear wheels; castors pivotally mounted upon said frame whereby the same may be transported; means for lowering and raising said castors whereby said frame may rest upon the ground and be easily transported; inclines hingedly connected to the frame and a draw-bar connected to the inclines whereby said device may be towed behind a motor vehicle and directly in line with the rear wheels thereof to facilitate placement of said vehicle on said device.

2. A portable power transmitting device for transmitting power from motor vehicles comprising a substantially rectangular frame having a pair of rollers rotatably mounted in each end thereof, each pair of rollers being arranged to engage and support one of the rear wheels of a motor vehicle and to be rotated thereby; a pulley rotatably mounted in one end of said frame and operatively connected to the rollers; a pair of channels mounted upon the upper and lower sides respectively of each end of said frame, said channels having their ends offset beyond the ends of said frame; a threaded shaft rotatably mounted between each pair of offset ends, said shaft having a squared end; and a castor pivotally mounted upon each shaft and between said channel ends whereby said castors may be raised and lowered to raise and lower said frame.

3. A portable power transmitting device for transmitting power from motor vehicles comprising a substantially rectangular frame having a pair of rollers rotatably mounted in each end thereof, each pair of rollers being arranged to engage and support one of the rear wheels of a motor vehicle and to be rotated thereby; a pulley rotatably mounted in one end of said frame and operatively connected to the rollers; a pair of channels mounted upon the upper and lower sides respectively of each end of said frame, said channels having their ends offset beyond the ends of said frame; a threaded shaft rotatably mounted between each pair of offset ends, said shaft having a squared end; a castor pivotally mounted upon each shaft and between said channel ends whereby said castors may be raised and lowered to raise and lower said frame; and means pivotally mounted upon the frame for engaging the forward side of the rear axle of a motor vehicle on said frame to retain said vehicle upon said frame while the wheels thereof are rotating the rollers.

4. A portable power transmitting device for transmitting power from motor vehicles comprising a substantially rectangular frame having a pair of rollers rotatably mounted in each end thereof, each pair of rollers being arranged to engage and support one of the rear wheels of a motor vehicle and to be rotated thereby; a pulley rotatably mounted in one end of said frame and operatively connected to the rollers; a pair of channels mounted upon the upper and lower sides respectively of each end of said frame, said channels having their ends offset beyond the ends of said frame; a threaded shaft having a squared end; a castor pivotally mounted upon each shaft and between said channel ends whereby said castors may be raised and lowered to raise and lower said frame; and adjustable means pivotally mounted upon the frame for engaging the front side of the rear axle of a motor vehicle mounted upon the device to retain said vehicle on said device while the wheels thereof are rotating the rollers.

5. A portable power transmitting device for transmitting power from motor vehicles comprising a substantially rectangular frame having a pair of rollers rotatably mounted in each end thereof, each pair of rollers being arranged to engage and support one of the rear wheels of a motor vehicle and to be rotated thereby; a pulley rotatably mounted in one end of said frame and operatively connected to the rollers; a pair of channels mounted upon the upper and lower sides respectively of each end of said frame, said channels having their ends offset beyond the ends of said frame; a threaded shaft rotatably mounted between each pair of offset ends, said shaft having a squared end; a castor pivotally mounted upon each shaft and between said channel ends whereby said castors may be raised and lowered to raise and lower said frame; a pair of threaded rods transversely and rotatably mounted upon the frame and having squared ends to receive a rotating tool; and braces screwed upon said rods and arranged when in one position to engage the front side of a rear axle of the vehicle to retain said vehicle on said device while the wheels thereof are rotating the rollers.

6. A portable power transmitting device for transmitting power from motor vehicles comprising a substantially rectangular frame having a pair of rollers rotatably mounted in each end thereof, each pair of rollers being arranged to engage and support one of the rear wheels of a motor vehicle and to be rotated thereby; a pulley rotatably mounted in one end of said frame and operatively connected to the rollers; a pair of channels mounted upon the upper and lower sides respectively of each end of said frame, said channels having their ends offset beyond the ends of said frame; a threaded shaft rotatably mounted between each pair of offset ends, said shaft having a squared end; a castor pivotally mounted upon each shaft and between said channel ends whereby said castors may be raised and lowered to raise and lower said frame; and suitable inclines hingedly connected to the frame and opposite the rollers thereon to facilitate placement and removal of a motor vehicle onto and off of said device.

7. A portable power transmitting device for transmitting power from motor vehicles comprising a substantially rectangular frame having a pair of rollers rotatably mounted in each end thereof, each pair of rollers being arranged to engage and support one of the rear wheels of a motor vehicle and to be rotated thereby; a pulley rotatably mounted in one end of said frame and operatively connected to the rollers; a pair of channels mounted upon the upper and lower sides respectively of each end of said frame, said channels having their ends offset beyond the ends of said frame; a threaded shaft rotatably mounted between each pair of offset ends, said shaft having a squared end; a castor pivotally mounted upon each shaft and between said channel ends whereby said castors may be raised and lowered to raise and lower said frame; and a suitable drawbar operatively connected to said inclines whereby the device may be towed by a motor vehicle with the rollers thereof directly in line with the wheels of said vehicle to facilitate placement of said wheels onto said rollers.

8. A portable power transmitting device for transmitting power from motor vehicles comprising a substantially rectangular frame having a pair of rollers rotatably mounted in each end thereof, each pair of rollers being arranged to engage and support one of the rear wheels of a motor vehicle and to be rotated thereby; a pulley rotatably mounted in one end of said frame and operatively connected to the rollers; a pair of channels mounted upon the upper and lower sides respectively of each end of said frame, said channels having their ends offset beyond the ends of said frame; a threaded shaft rotatably mounted between each pair of offset ends, said shaft having a squared end; a castor pivotally mounted upon each shaft and between said channel ends whereby said castors may be raised and lowered to raise and lower said frame; and means for preventing rotation of the rollers while the vehicle is being moved onto or off of the device.

9. A portable power transmitting device for transmitting power from motor vehicles comprising a substantially rectangular frame having a pair of rollers rotatably mounted in each end thereof, each pair of rollers being arranged to engage and support one of the rear wheels of a motor vehicle and to be rotated thereby; a pulley rotatably mounted in one end of said frame and operatively connected to the rollers; a pair of channels mounted upon the upper and lower sides respectively of each end of said frame, said channels having their ends offset beyond the ends of said frame; a threaded shaft rotatably mounted between each pair of offset ends, said shaft having a squared end; a castor pivotally mounted upon each shaft and between said channel ends whereby said castors may be raised and lowered to raise and lower said frame; and a suitable brake arranged to engage one of the rollers and thereby prevent rotation of all rollers while the vehicle is being moved onto or off of the device.

In witness whereof I hereunto set my signature.

WILLIAM J. LINDECKER.